US012620793B2

(12) United States Patent
Wurms et al.

(10) Patent No.: US 12,620,793 B2
(45) Date of Patent: May 5, 2026

(54) ELECTRICAL FLOOR BOX ASSEMBLY AND METHOD OF INSTALLING SAME

(71) Applicant: Hubbell Incorporated, Shelton, CT (US)

(72) Inventors: Scott Wurms, Shelton, CT (US); Joseph Cretella, Ansonia, CT (US)

(73) Assignee: Hubbell Incorporated, Shelton, CT (US)

( * ) Notice: Subject to any disclaimer, the term of this patent is extended or adjusted under 35 U.S.C. 154(b) by 184 days.

(21) Appl. No.: 18/514,421

(22) Filed: Nov. 20, 2023

(65) Prior Publication Data

US 2024/0170937 A1     May 23, 2024

Related U.S. Application Data

(60) Provisional application No. 63/427,604, filed on Nov. 23, 2022.

(51) Int. Cl.
*H02G 3/18*          (2006.01)
*H02G 3/08*          (2006.01)

(52) U.S. Cl.
CPC ............. *H02G 3/185* (2013.01); *H02G 3/081* (2013.01)

(58) Field of Classification Search
CPC .......... H02G 3/08; H02G 3/081; H02G 3/185; H02G 3/18; H02G 3/12; H02G 5/08; H02G 3/00; H02G 3/083; H02G 3/085; H02G 3/086; H02G 3/121; H02G 3/128; H02G 3/16; H02G 3/36; H02G 3/38; H02G 5/00; H02G 5/06; H02G 5/066; H02G 5/068; H02G 9/00; H01R 4/66

USPC ....... 174/50, 53, 57, 58, 492, 483, 487, 490, 174/51, 520; 220/3.2–3.9, 4.02; 248/906, 343
See application file for complete search history.

(56)          References Cited

U.S. PATENT DOCUMENTS

| | | | | |
|---|---|---|---|---|
| 4,331,832 A | | 5/1982 | Curtis et al. | |
| 5,285,009 A | * | 2/1994 | Bowman ................ | H02G 3/185 174/503 |
| 5,455,388 A | | 10/1995 | Pratt | |
| 5,796,037 A | * | 8/1998 | Young .................... | H02G 3/185 174/488 |
| 6,232,553 B1 | * | 5/2001 | Regen .................... | H02G 3/083 220/3.8 |
| 6,274,809 B1 | * | 8/2001 | Pudims .................. | H02G 3/185 174/53 |
| 7,075,005 B1 | * | 7/2006 | Drane .................... | H02G 3/185 174/53 |
| 7,388,164 B2 | | 6/2008 | Scanzillo | |

(Continued)

OTHER PUBLICATIONS

International Search Report and Written Opinion issued on May 16, 2024, by the International Searching Authority in corresponding International Application No. PCT/US2023/080541. (15 pages).

*Primary Examiner* — Angel R Estrada
(74) *Attorney, Agent, or Firm* — Robinson + Cole LLP

(57)          ABSTRACT

An electrical floor box assembly includes a grounding bus to provide a grounding path for one or more electrical devices positioned in the floor box. The floor box includes a base and a top. The top is configured to be removably secured to the base to at least partially close an interior space of the base. The top includes an opening for providing access to a user to the interior space of the base when the top is secured to the base.

20 Claims, 11 Drawing Sheets

(56)                    References Cited

U.S. PATENT DOCUMENTS

| 8,153,910 B1 * | 4/2012 | Penczak ................. H02G 3/185 |
| | | 174/486 |
| 8,378,232 B2 * | 2/2013 | Drane .................... H02G 3/383 |
| | | 174/559 |
| 8,759,674 B2 * | 6/2014 | Korcz .................... H02G 3/121 |
| | | 174/480 |
| 9,035,182 B2 | 5/2015 | Scanzillo et al. |
| 9,035,201 B2 * | 5/2015 | Jones .................... H02G 3/185 |
| | | 174/487 |
| 9,362,731 B2 * | 6/2016 | Carbone ................. H02G 3/14 |
| 9,667,053 B2 | 5/2017 | Wurms |
| 9,780,546 B2 | 10/2017 | Carbone et al. |
| 9,887,527 B2 | 2/2018 | Scanzillo et al. |
| 11,133,659 B2 | 9/2021 | Cretella et al. |
| 2010/0193237 A1 | 8/2010 | Drane |
| 2016/0157364 A1 | 6/2016 | Blossfeld et al. |
| 2023/0096708 A1 | 3/2023 | Wurms et al. |

* cited by examiner

ELECTRICAL FLOOR BOX ASSEMBLY AND METHOD OF INSTALLING SAME

RELATED APPLICATION(S)

This claims priority to U.S. Provisional Application 63/427,604, filed Nov. 23, 2022, the disclosure of which is incorporated herein by reference in its entirety and to which priority is claimed.

FIELD

The present disclosure relates to an electrical floor box assembly, more particularly, for housing electrical components underneath a floor surface.

BACKGROUND

Electrical floor boxes are known in the art to serve as a connection point for electrical power and/or low voltage (e.g., data, multi-media) devices on a walking plane within a building, i.e., in a floor.

Conventional electrical floor boxes, such as recessed electrical floor boxes, are entirely made of metal, or include a metallic base with a non-metallic top. One reason for using a metal base in conventional electrical floor boxes is to provide sufficient conductivity for grounding purposes.

Furthermore, regulatory requirements concerning grounding are conventionally more easily met using metal boxes. For example, certain jurisdictions require that at least one ground screw be provided for every gang or device. Additionally, the removal on one device must not disturb the continuity of the grounding circuit. This is more easily accomplished with a conventional metal box, because the metal box typically provides continuity between grounding locations.

For example, some conventional electrical floor boxes include a base made of cast iron (especially for slab-on-grade applications), or stamped steel or sheet metal box that may be painted or non-painted. These solutions are typically rather expensive. Furthermore, buried metal electrical floor boxes are susceptible to corrosion due to water intrusion or humid environments, especially during the construction phase of a building, but also during use.

Additionally, conventional electrical floor boxes traditionally require disassembly for installation of conduit.

SUMMARY

Various embodiments of the present disclosure can overcome various of the aforementioned and other disadvantages associated with known electrical floor boxes and offer new advantages as well.

Various exemplary embodiments are directed to an electrical floor box assembling having a base including a bottom wall and a plurality of lateral walls extending from the bottom wall to at least partially define an interior space having at least one compartment. A top is configured to be removably secured to the base to at least partially close the interior space. The top includes an opening for providing access to a user to the interior space of the base when the top is secured to the base. A grounding bus is configured to form a grounding path with an electrical device positioned in the at least one compartment Various exemplary embodiments are directed to an electrical floor box assembling having a base including a bottom wall and a plurality of lateral walls extending from the bottom wall to at least partially define an interior space having at least one compartment. A top is configured to be removably secured to the base to at least partially close the interior space. The top includes an opening for providing access to a user to the interior space of the base when the top is secured to the base. A grounding bus includes at least one conductive bracket and a conductive bridge. The at least one conductive bracket is configured for attachment to at least one electrical wire forming a grounding path with an electrical device positioned in the at least one compartment.

Various exemplary embodiments are directed to an electrical floor box assembly having a base and a top. The base includes a bottom wall and a plurality of lateral walls extending from the bottom wall to at least partially define an interior space having at least one compartment. The base is made from a non-metallic material. The top is configured to be removably secured to the base to at least partially close the interior space. The top includes an opening for providing access to a user to the interior space of the base when the top is secured to the base. The top is made from a metallic material. A grounding bus is positioned in the interior and configured to provide a grounding path with an electrical device positioned in the at least one compartment and the top.

Various exemplary embodiments are directed to an electrical floor box assembling having a base including a bottom wall and a plurality of lateral walls extending from the bottom wall to at least partially define an interior space having at least one compartment. A top is configured to be removably secured to the base to at least partially close the interior space. The top includes an opening for providing access to a user to the interior space of the base when the top is secured to the base. A conduit hub is disposed on at least one of the plurality of lateral walls or the bottom wall. A center drill point is configured for locating an opening for mounting a terminal adapter for a conduit attachment.

Various exemplary embodiments are directed to a method for installing an electrical floor box assembly. The method comprises securing a top of the electrical floor box assembly to a base of the electrical floor box assembly, and securing the electrical floor box assembly to a support surface that is parallel to and recessed from a floor. The base includes a bottom wall and a plurality of lateral walls extending from the bottom wall to at least partially define an interior space. The bottom wall and lateral walls of the base are made of a non-metallic material. The top is configured to be removably secured to the base to at least partially close the interior space, the top including an opening for providing access to a user to the interior space of the base when the top is secured to the base. The top is made of metal. The electrical floor box assembly further comprises a grounding bus including at least one conductive base element and a conductive bridge. The at least one conductive base element is coupled to the bottom wall of the base, and is configured for attachment to at least one electrical wire. The conductive bridge is metallic and in contact with or integral with the at least one conductive base element. The securing of the top to the base establishes an electrical connection between the top and the grounding bus.

The disclosure herein should become evident to a person of ordinary skill in the art given the following enabling description and drawings. The drawings are for illustration purposes only and are not drawn to scale unless otherwise indicated. The drawings are not intended to limit the scope of the invention. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred embodiments and reference to the accompany drawing.

DETAILED DESCRIPTION

Figure 1:
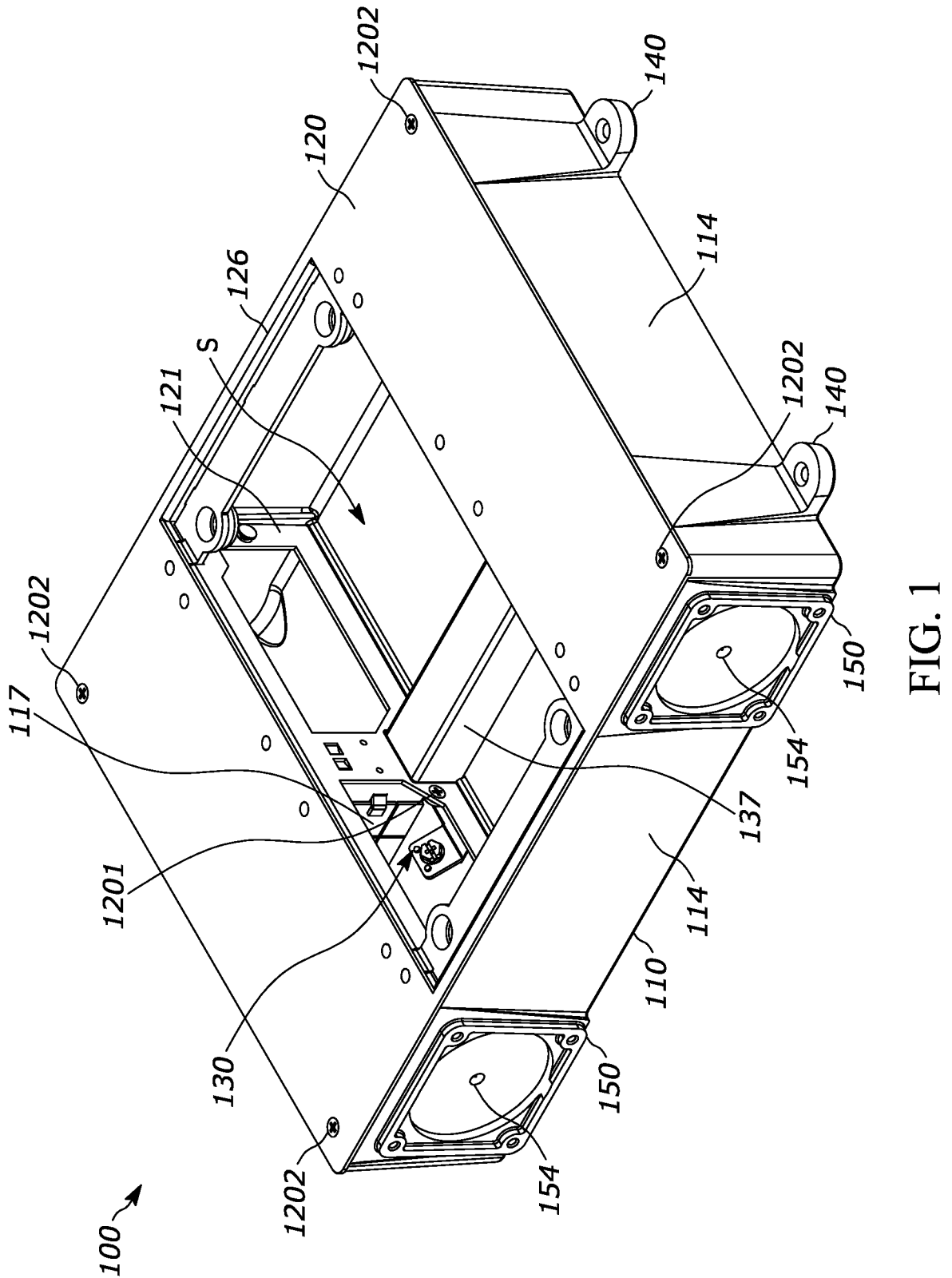
FIG. 1 shows a top perspective view of an electrical floor box assembly according to an exemplary embodiment of the disclosure.

A floor box assembly can include a floor box and a cover configured to connect to the floor box. The floor box is intended to be mounted in the floor of a building and to house one or more electrical components that are accessible to a user through the cover. The electrical components can include various wiring devices such as electrical receptacles, video connections, phone connections, data connections, or other power or communication devices. The floor box can have a variety of configurations that includes different sizes and shapes and different internal and external components. The different components can be modular to create different configurations within a single floor box. Different covers can also be used with different floor boxes. As would be understood by one of ordinary skill in the art, the floor box can be classified by the number of electrical components or gangs that can be placed into the floor box.

Various exemplary embodiments are directed to a floor box made of non-metallic material that can still meet the relevant grounding requirements for electrical devices and installations. Conventional electrical floor boxes, especially those used in commercial applications, typically include a metallic base, principally to meet grounding needs and requirements. In other words, conventional electrical floor boxes are not made of plastic or other non-conductive materials in order to meet those grounding needs and requirements. Various embodiments can provide a grounding path from inside of the floor box to an exterior to meet the grounding requirements. In an exemplary configuration, a grounding bus can be provided in a non-metallic base to allow for a grounding connection to be made to a metallic top or cover. Other configurations can utilize different grounding paths to a metallic cover or to another grounding component outside of the floor box.

Compared to conventional solutions, a base with a bottom wall and lateral walls made of a non-metallic material, such as plastic, provides more flexibility, and facilitates more efficient installation. Furthermore, non-metallic materials, such as plastics, offer superior corrosion resistance for the electrical floor box assembly, during construction phases and subsequent usage. For example, contrary to a metal base, a non-metallic base, e.g., made of plastic, will not corrode in the event of moisture collecting inside the electrical floor box. A non-metallic base, e.g., made of plastic, is also more cost-effective than conventional metallic solutions. For example, in slab-on-grade applications, a non-metallic base, e.g., made of plastic, can avoid the need for a more expensive cast iron electrical floor box base. Non-metallic bases, e.g., made of plastic, are also generally more cost-effective to produce in high volume. A non-metallic base, e.g., made of plastic, is also easier to configure. For example, passing conduit or other equipment typically requires drilling holes, which are easier to drill in some non-metallic materials, such as plastic, than in metal.

FIGS. 1-6 show an illustrative embodiment of an electrical floor box assembly 100. The electrical floor box assembly 100 comprises a base 110 including a bottom wall 112 and a plurality of lateral walls 114 extending from the bottom wall 112 to at least partially define an interior space S. The bottom wall 112 can be integral with the lateral walls 114 or can be attached thereto by any suitable fastening method, including mechanical fasteners (e.g., screws) or through a joining connection (e.g., welding).

The bottom wall 112 and lateral walls 114 of the base 110 are made of a non-conductive material for example a non-metallic material, and therefore do not conduct electricity for purposes of creating a grounding path. For example, the base 110 can be made of plastic, such as, but not limited to, polyvinyl chloride (PVC), or other suitable plastics. Various non-plastic materials may also be used to form the bottom wall 112 and lateral walls 114 of the base 110, such as, but not limited to, fiberglass and phenolics, or other suitable non-corroding, non-metallic and non-porous materials. In some embodiments, the bottom wall 112 and lateral walls 114 of the base 110 may be 3D printed.

The electrical floor box assembly 100 includes one or more dividers 117 configured to separate various compartments of the space S. In an exemplary application, one compartment may house power supply equipment (e.g., power outlets), while the other compartment may house low-voltage equipment (e.g., USB or other data outlets).

The electrical floor box assembly 100 further comprises a top 120 configured to be removably secured to the base 110 to at least partially close the interior space S. The top 120 includes an opening 126 for providing access to a user to the interior space of the base 110 when the top 120 is secured to the base 110.

Figure 2:
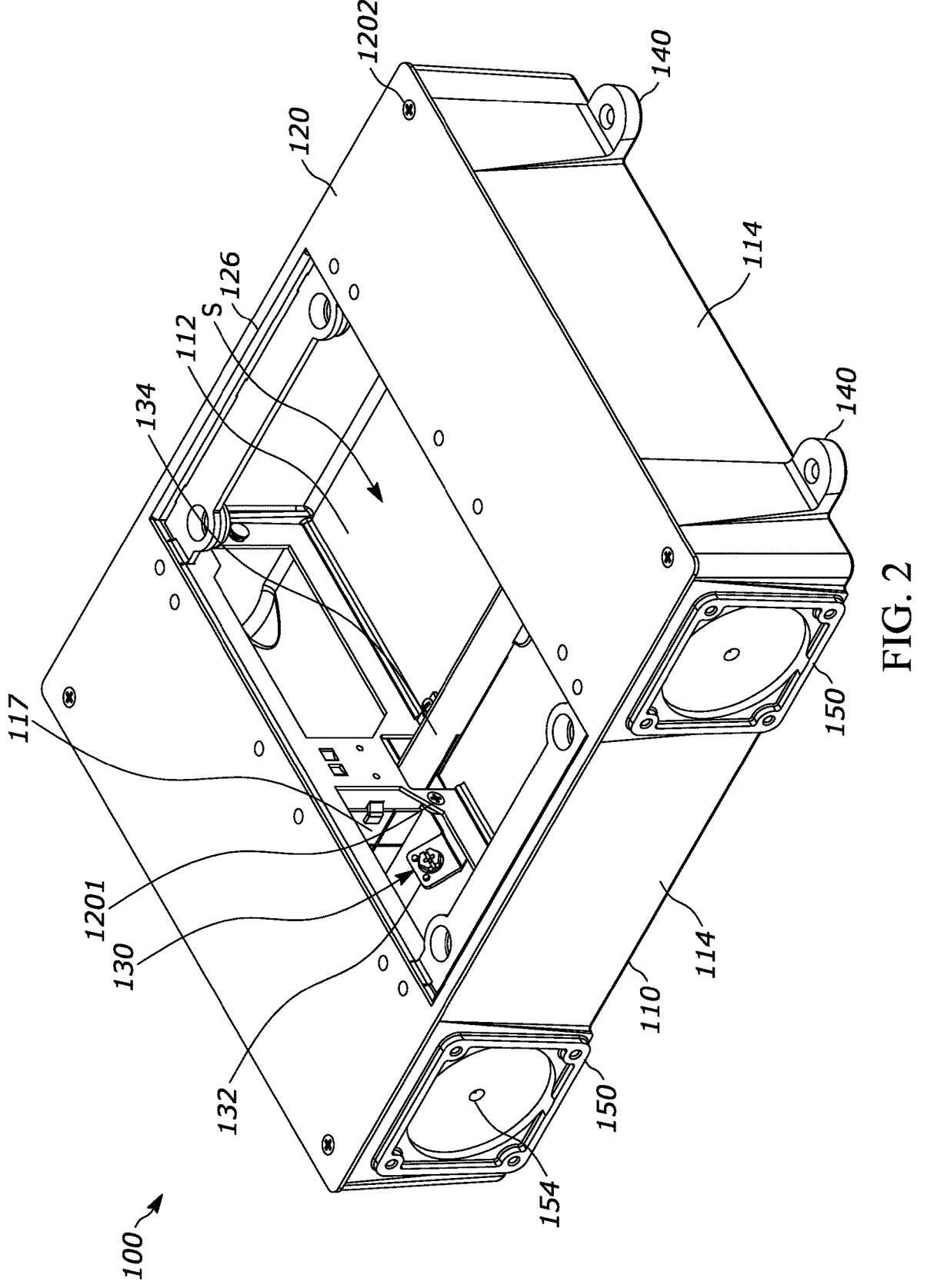
FIG. 2 shows a top perspective view of the electrical floor box assembly of FIG. 1 with the wireway cover removed.
Figure 3:
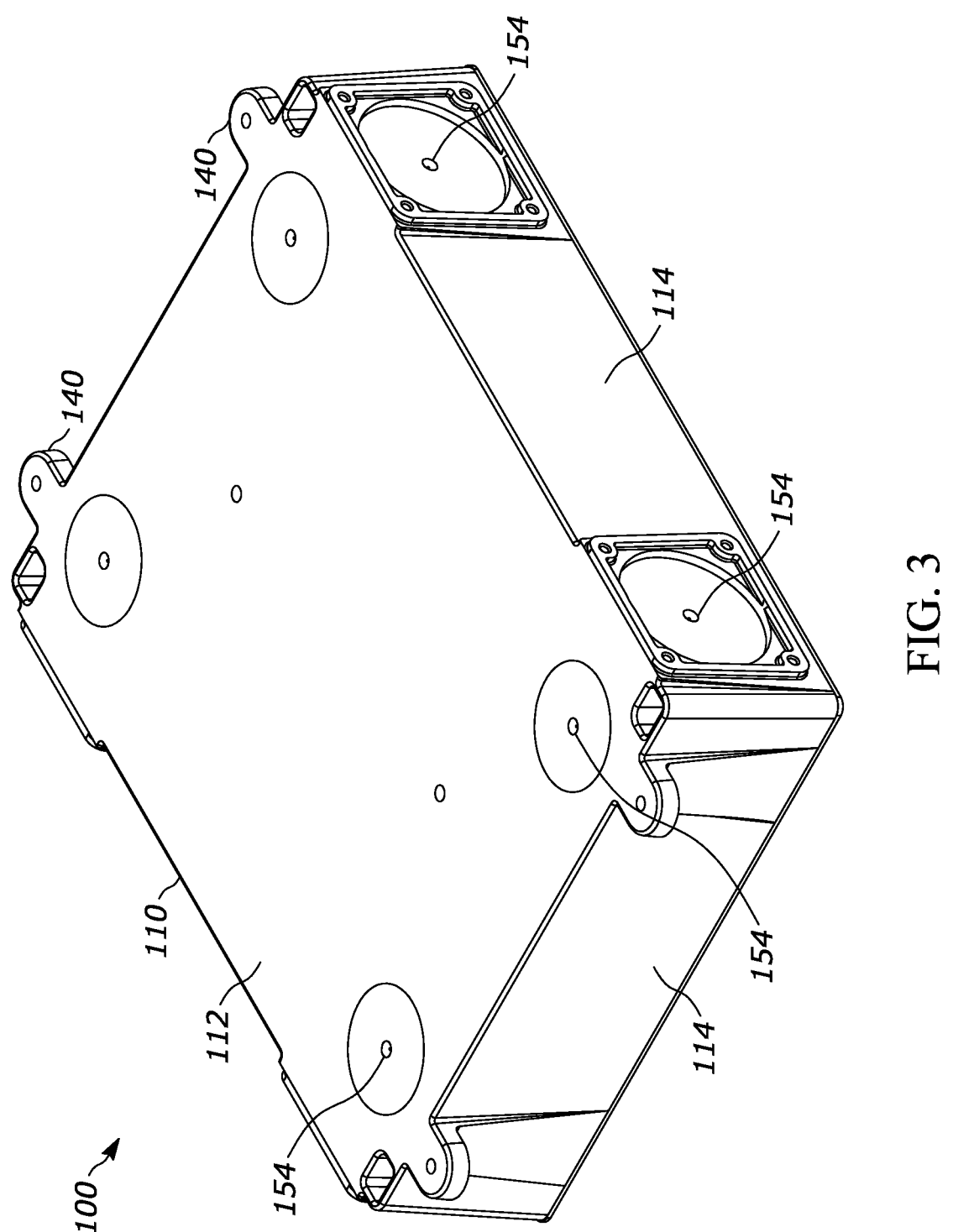
FIG. 3 shows a bottom perspective view of the electrical floor box assembly of FIG. 1.

In certain configurations the top 120 is made of metal. For example, the top 120 can be made of cast iron or stamped steel, zinc, aluminum, or other suitable metals. As will be further described below, the top 120 can function as part of a grounding path. Moreover, the top 120 can be configured for mounting additional receptacle and cover plate structures, via, for example, mounting openings. In FIGS. 1-6, the electrical floor box assembly 100 has a generally rectangular cross-section, and has a generally rectangular top 120. The top 120 may be configured to be mounted with a rectangular adapter to fit a cover plate of another shape, such as a round plate. The top 120 can be attached to the base 110 by any suitable fastening method, including but not limited to screws. In FIGS. 1 and 2, the top 120 is shown as being secured to the base 110 using grounding screws 1201 and corner screws 1202.

Figure 4:
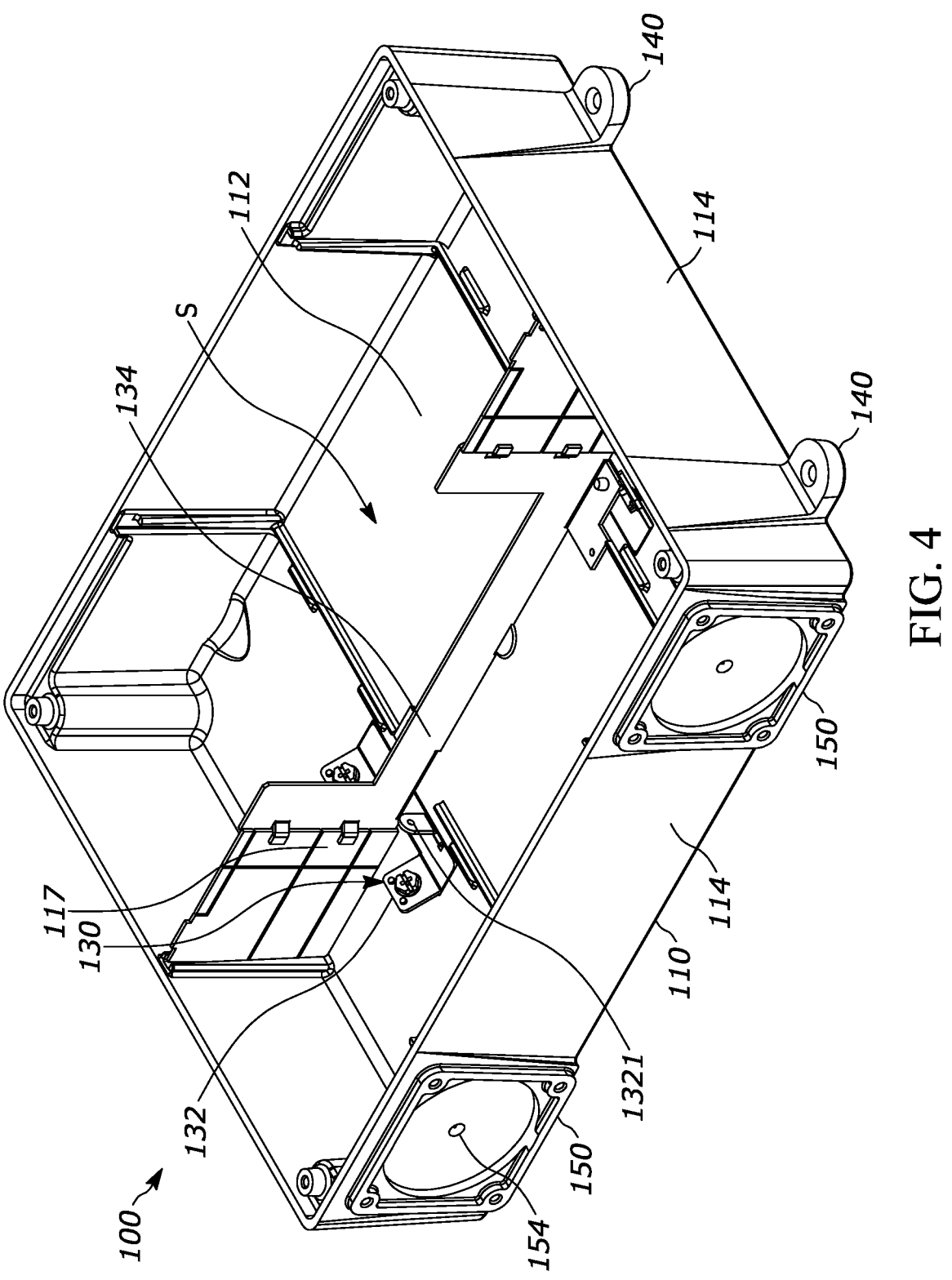
FIG. 4 shows a top perspective view of the electrical floor box assembly of FIG. 1 with the top and wireway cover removed.
Figure 5:
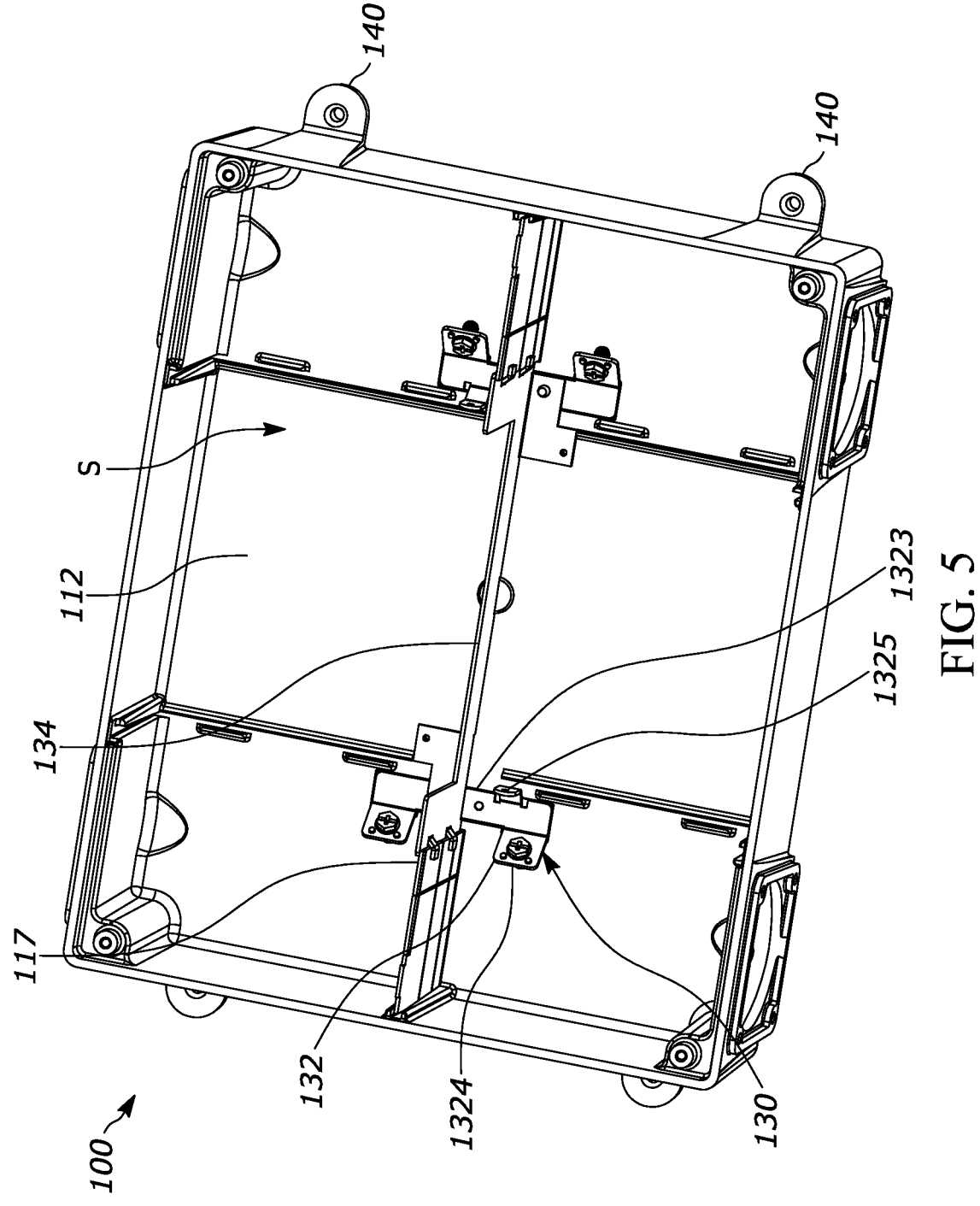
FIG. 5 shows another top perspective view of the electrical floor box assembly of FIG. 1 with the top and wireway cover removed.
Figure 6:
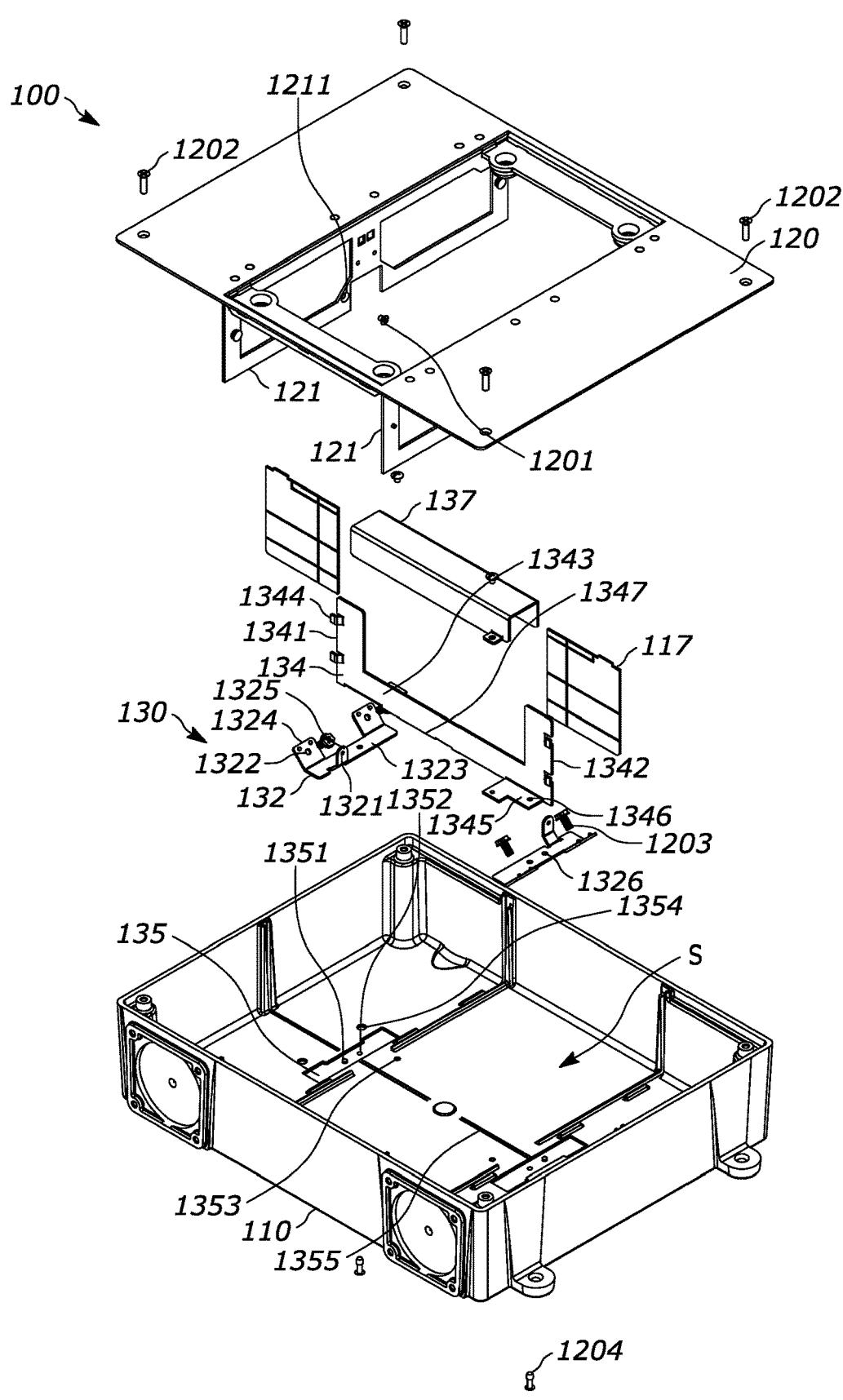
FIG. 6 shows an exploded perspective view of the electrical floor box assembly of FIG. 1.

As best shown in FIGS. 4-6, the electrical floor box assembly 100 can include a grounding bus 130. In an exemplary configuration the grounding bus 130 has at least one conductive base, for example a conductive bracket 132 and a conductive bridge 134. The grounding bus 130 may form another part of the grounding path. The conductive bracket 132 is coupled to the bottom wall 112 of the base 110 and is configured for attachment to at least one electrical wire, for example a grounding wire connected to an electrical device positioned in one of the compartments. The conductive bridge 134 is conductive and is connected with or integral (i.e., monolithic) with the conductive base element 132. The conductive bracket 132 and the conductive bridge 134 can be made from or include a metallic material.

In certain configurations, as depicted in FIGS. 1-6, the conductive base element 132 is located at the bottom wall 112 of the base 110. This location may be preferred for ease of access to the conductive base element 132 during installation of equipment in the electrical floor box assembly 100. Alternatively, the conductive base element 132 may be located on a lateral wall 114 of the base 110.

In an illustrative embodiment, the electrical floor box assembly 100 may include a plurality of conductive base elements 132 in contact with or integral with the conductive bridge 134. In the case of a multi-gang electrical floor box, the grounding bus 130 can provide grounding across all conductive base elements 132 of the electrical floor box. Accordingly, longer electrical floor boxes may be constructed while maintaining proper grounding across all electrical equipment. Grounding busses 130 can be configured as needed for any number of multi-gang configurations.

In the illustrated embodiment, the conductive bracket 132 includes a conductive plate with a wire attachment opening 1322 (see FIG. 6) for connecting a wire (e.g., using a screw 1203). The conductive bracket 132 can include one or more metal pieces, or more specifically fabricated sheet metal pieces. For example, the conductive plate (as illustrated) may be a bent plate and may include a horizontal first portion 1323 attached to the top surface of the bottom wall 112 of the base 110, one or more second portions 1324 angled relative to the first portion and including wire attachment openings 1322, and one or more third portions 1325 angled relative to the first portion and including a top attachment opening 1321 for connection to the top 120. The conductive plate may be formed of a single plate or multiple plates joined together. Alternatively, the conductive bracket 132 may be a die-cast part, or a single wire, looped or nonlooped, braided or unbraided, or a loop made of wire, or any other suitable conductive element configured for attachment to an electrical wire. In certain embodiments, the conductive bracket 132 can utilize conductive paths housed in non-conductive material.

In various configurations the conductive bracket 132 can include one or more top attachment openings 1321 for connection with the top 120 and one or more wire attachment openings 1322 for connecting a grounding wire using a grounding screw or other fastener. As illustrated, the conductive bracket 132 is a single piece including two wire attachment openings 1322 for connecting wires, and a top attachment opening 1321 for connecting to the top 120. The two wire attachment openings 1322 may be located in different compartments within the electrical box assembly and may be thus separated by the conductive bridge 134 and/or a divider 117. The conductive bracket 132 can also include one or more lower attachment openings 1326 that are configured to receive a fastener to secure the conductive bracket 132 to the base 110 and/or the conductive bridge 134.

In the illustrated embodiment, the conductive bridge 134 includes a first portion 1341, a second portion 1342, and a central portion 1343 extending between the first portion 1341 and the second portion 1342. The first and second portions 1341, 1342 can have an upright configuration extending between the base 110 and the top 120. One or more tabs 1344 can extend from each of the first portion 1341 and the second portion 1342. The tabs 1344 can extend at angled and are configured to hold a portion of a respective divider 117 as best shown in FIGS. 4 and 5.

The conductive bridge 134 can also include a flange 1345 positioned on each side of the conductive bridge 134. The flange 1345 can have a substantially L-shaped configuration, with a set of attachment openings 1346. The attachment openings 1346 are configured to help secure the conductive bridge 134 to the base 110 and/or the conductive bracket 132. One or more tabs 1347 can also extend form the bottom of the conductive bridge 134 to help secure the conductive bridge 134 in the base 110.

In various exemplary embodiments, the base 110 can include one or more recesses 135 configured to receive the conductive brackets 132. The recesses 135 can be positioned on opposite sides of the interior adjacent the different compartments. Positioned inside each recess 135 can be a projection 1351 and an opening 1352. The projection 1351 and the recess opening 1352 can be configured can be configured to facilitate securing the conductive bracket 132 and/or bridge 134. In certain configurations, another attachment opening 1353 can be positioned toward the center of the interior from the recesses 135. This attachment opening 1353 can receive a fastener to help secure the conductive bridge 134 to the base 130. A pair of openings 1354 can be positioned away from the center of the interior from the recesses 135. These openings are configured to receive at least a portion of the grounding screws that extend through the attachment openings 1322 in the conductive bracket 132. One or more slots 1355 can also extend into the base 110 to receive the conductive bridge 134.

The conductive brackets 132 and the conductive bridge 134 are configured to be in an electrical connection. In certain configurations, as best shown in FIGS. 4 and 5, during assembly a conductive bracket 132 can be positioned in each recess 135. The projection 1351 can extend through one of the attachment openings 1326 in the horizontal portion 1323 of the conductive bracket 132. The conductive bridge 134 can be placed in contact with the conductive brackets 132 and positioned so that the tabs 1347 extend into the slots 1355. The attachment opening 1326 in the conductive bracket 132 not receiving the projection 1351 is aligned with one of the attachment openings 1346 on the flange 1345 of the conductive bridge 134 and the recess opening 1352. A fastener, for example a rivet 1204, can extend through these openings 1326, 1345, 1352 to help secure the conductive bracket 132 and bridge 134 to the base 110. Another fastener can extend through the opening 1352 in the base 110 and the other attachment opening 1346 in the flange 1345.

In certain embodiments the grounding bus 130 electrically connects to the top 120 when the top 120 is secured to the base 110. For example, the top 120 can include one or more conductive top elements 121 oriented toward the bottom wall 112 and penetrating within the base 110 for contact and attachment to the grounding bus 130. In an exemplary configuration, the top elements 121 can be face plates that help define the interior compartments for electrical devices. These faceplates can include openings 1211 configured to receive a fastener 1201. The openings 1211 can be configured to align with the openings 1321 on the third portions 1325 of the conductive brackets 132. A fastener can extend through the openings 1211, 1321 to connect the conductive bracket 132 to the top 120. The conductive top elements 121 can be made of metal and configured to conduct electricity from the grounding bus 130.

Accordingly, the conductive base element 132, conductive bridge 134 and top 120 can function as a grounding path. That is, the grounding bus 130 arrangement herein can provide suitable grounding notwithstanding the non-metallic base 110 of the electrical floor box assembly 100. In illustrative embodiments, the conductive bridge 134 may be further configured to contact the top 120 when the top 120 is secured to the base 110, by vertically extending to the top 120, to provide an additional electrical connection between the conductive base element 132 and the top 120.

The top attachment openings 1321 in the conductive base element 132 can have the advantageous dual function of securing the top 120 via a conductive top element 121, as well as providing grounding of the metal top 120 via the conductive top element 121. Further advantageously, the top attachment openings 1321 provide this dual function even in the event the top 120 fails to make proper contact with the base 110 (e.g., due to warping or other incidents). This is a significant advantage over conventional metal electrical floor boxes, which may rely simply on peripheral contact of the metal top with the metal base for purposes of grounding the metal top.

A wireway cover 137 may be configured to cover the conductive bridge 134 to facilitate the separation of wires in different compartments of the electrical floor box assembly 100, such as power and low voltage compartments. As illustrated, the wireway cover 137 may cover a portion of the conductive bridge 134 so as to create two wire compartments. The wireway cover 137 may be secured to the base 110 using screws and may be part of the grounding path.

In FIGS. 1-6, the conductive top elements 121 are further configured to facilitate assembly of the top 120 with the base 110. For example, lateral walls 114 of the base 110 can include guiding tracks or rails configured to receive lateral ends of the conductive top elements 121 to guide the top 120 into desired placement relative to the base 110.

In an illustrative embodiment, the electrical floor box assembly 100 further comprises at least one flange 140 configured for securing the electrical floor box assembly 100 to a support surface that is parallel and in contact with the bottom wall 112 of the base 110. The support surface may be recessed from a walking plane, and may be horizontal. For example, flanges 140 can be configured for fixing the electrical floor box assembly 100 into the concrete of a sub-floor by driving a bolt, screw or other affixing device into the flange.

In illustrative embodiments, the non-metallic base 110 is configured for easy attachment of non-metallic conduits to the non-metallic base 110 without the need for floor box disassembly, for example by using non-metallic hubs mounted to the outside of the base 110. Alternatively, the base 110 can be provided with integrated hubs.

In illustrative embodiments, by providing hub mounting pads instead of integrated hubs, the installer can have greater flexibility in choosing conduit sizes for any conduit box entry. Illustrative embodiment may also incorporate conduit hubs as described in co-pending U.S. patent application Ser. No. 17/953,902, incorporated herein by reference for its disclosure of conduit hubs.

In some embodiments, the electrical floor box assembly 100 can comprise at least one conduit hub mounting pad 150 disposed on at least one of the plurality of lateral walls 114, and/or at the bottom wall, and configured for attachment with a respective conduit hub 152 (see, e.g., FIGS. 1A, 7A, 7B, 8A and 8B).

Figure 7A:
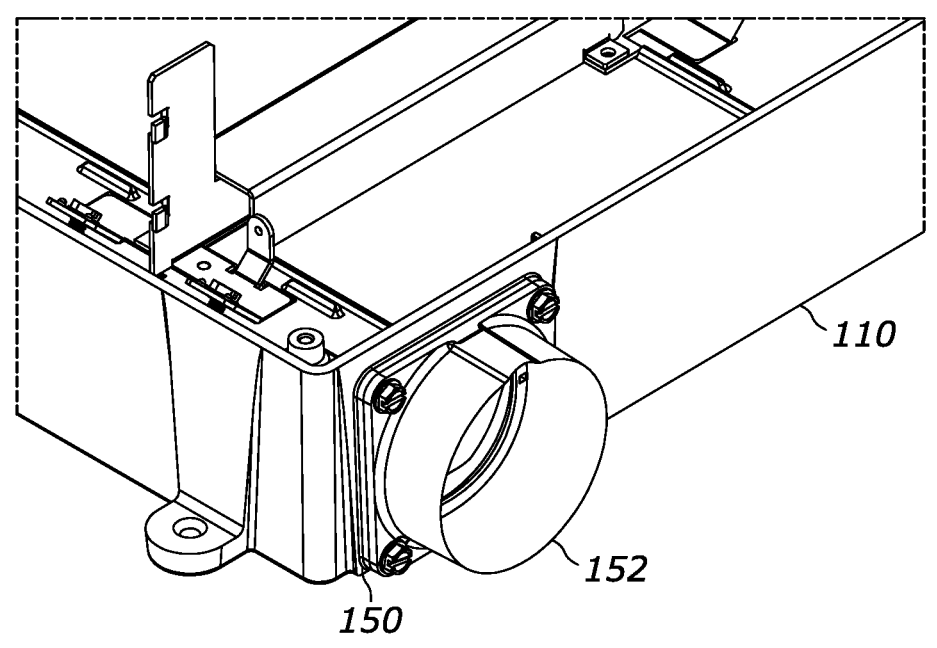
FIG. 7A shows a partial top perspective view of the electrical floor box assembly of FIG. 1 including a conduit hub on a lateral wall.
Figure 7B:
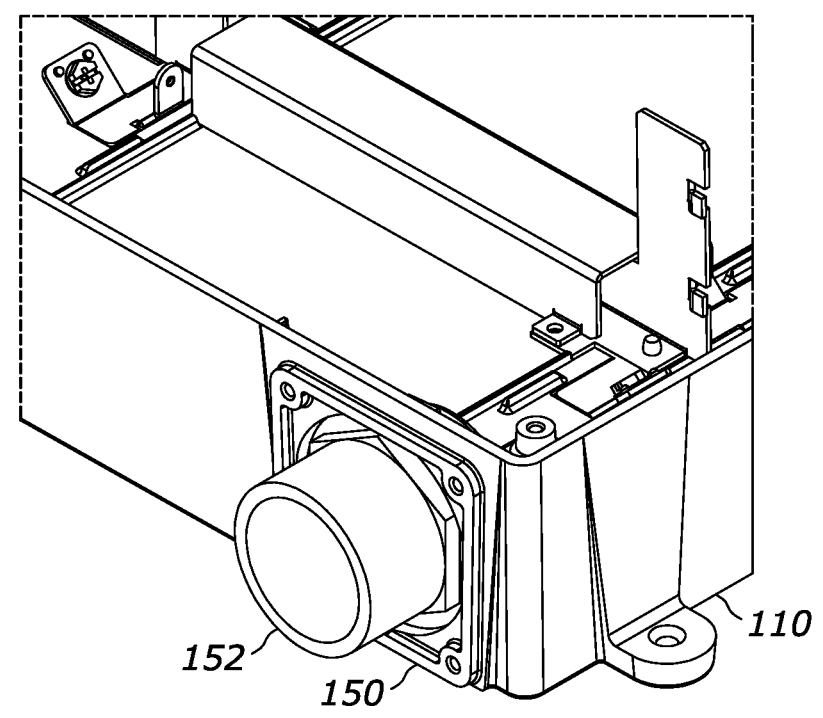
FIG. 7B shows another partial top perspective view of the electrical floor box assembly of FIG. 1 including a conduit hub on a lateral wall.
Figure 8A:
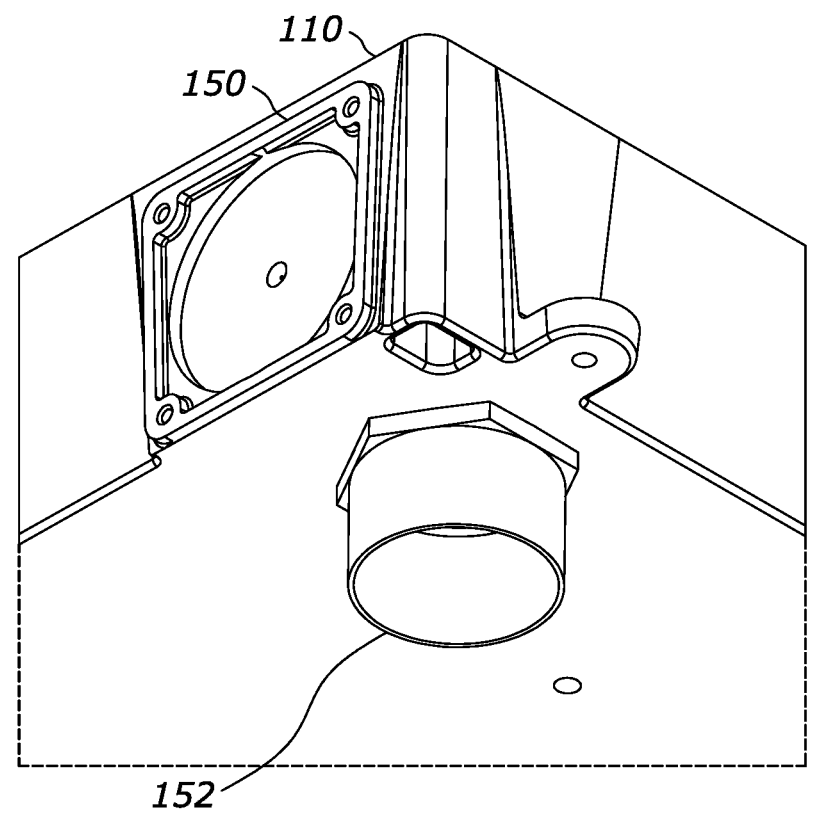
FIG. 8A shows a partial bottom view of the electrical floor box assembly of FIG. 1 including a conduit hub on the bottom wall.
Figure 8B:
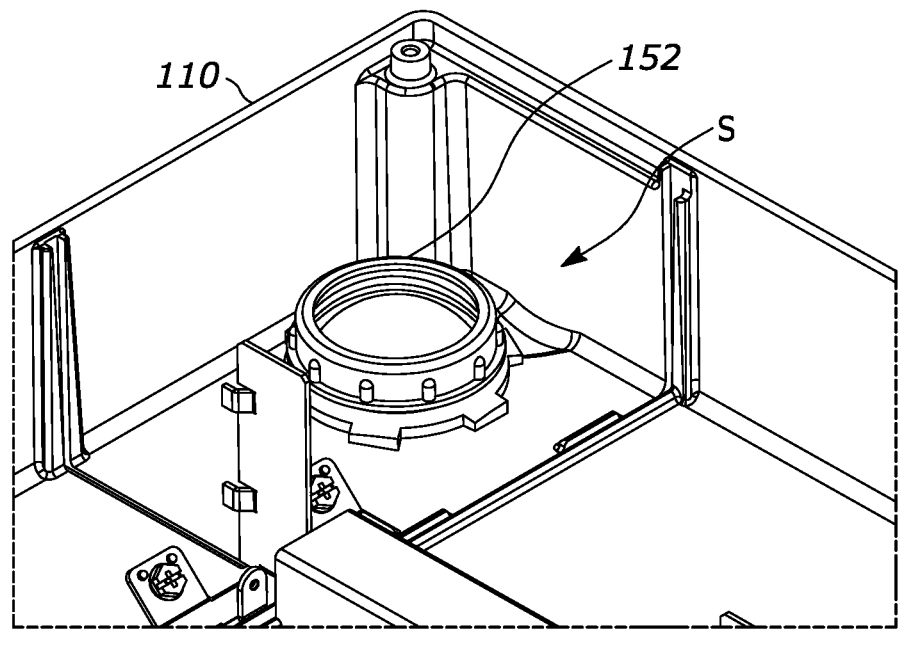
FIG. 8B shows a partial top view of the electrical floor box assembly of FIG. 8A.

Alternatively, or in addition, the electrical floor box assembly 100 can comprise at least one conduit hub 152 disposed on at least one of the plurality of lateral walls 114. FIG. 7A shows a conduit hub 152 secured with four corner screws to a conduit hub mounting pad 150. FIG. 7B shows a conduit hub 152 secured by a nut attachment to a conduit hub mounting pad 150. FIGS. 8A and 8B show another conduit hub 152 secured to the base 110 using a nut attachment.

In an illustrative embodiment, the electrical floor box assembly 100 further comprises at least one center drill point 154 as best shown in FIGS. 1 and 2. The Center drill point 154 is configured for locating an opening for mounting a terminal adapter for conduit attachment. An indication of maximum drill diameter can be indicated around the center drill point 154.

Turning to the installation of the electrical floor box assembly 100, an illustrative method for installing an electrical floor box assembly 100 comprises securing the top 120 to the base 110 and securing the electrical floor box assembly 100 to a support surface that is parallel to and recessed from a floor. The securing of the top 120 to the base 110 establishes an electrical connection between the top 120 and the grounding bus 130, and therefore provides desirable grounding. Illustrative embodiments disclosed herein may also permit a user to avoid the need to disassemble the electrical floor box when installing conduit.

Figure 9:
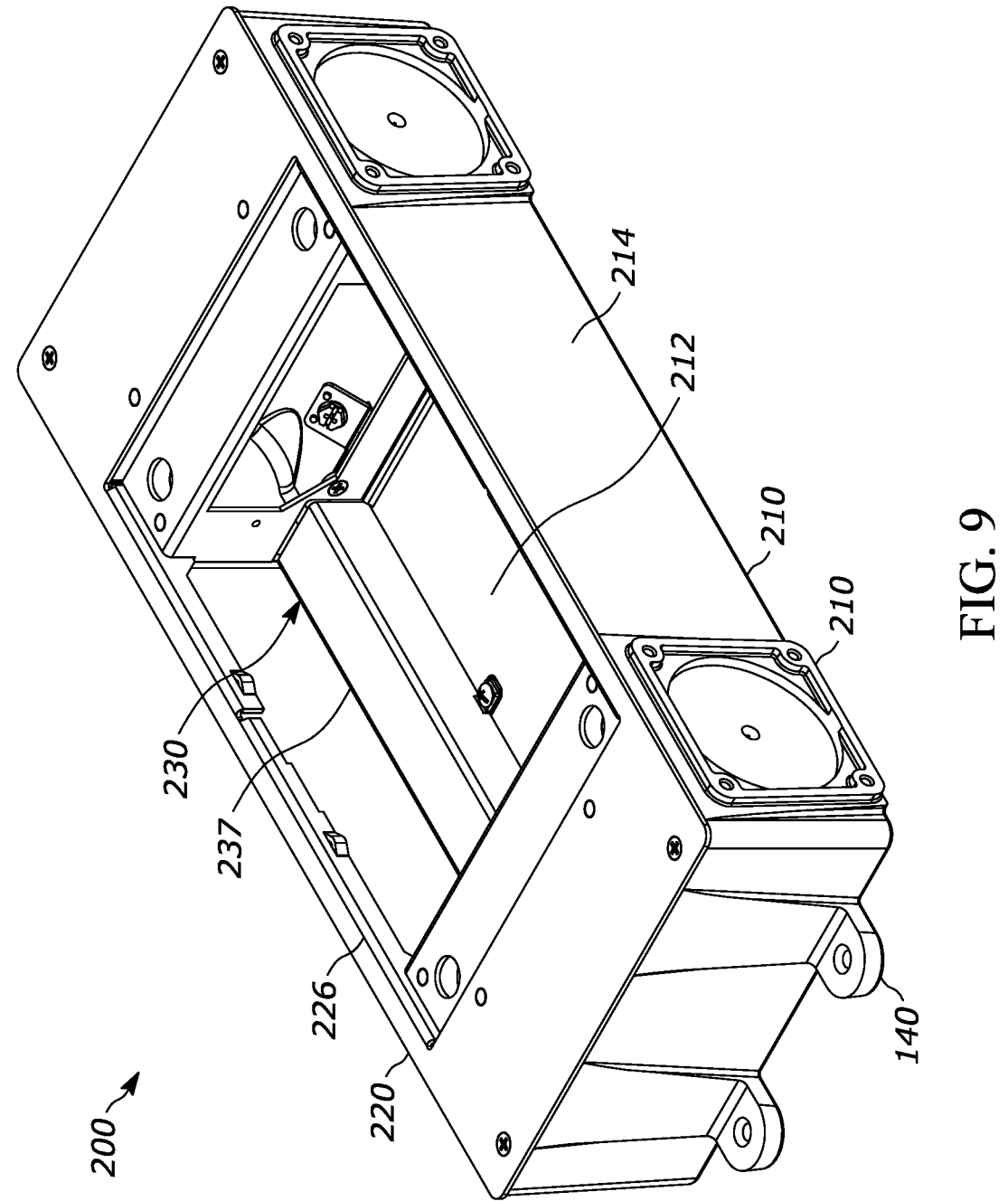
FIG. 9 shows a top perspective view of a single-compartment electrical floor box assembly according to an exemplary embodiment of the disclosure of the electrical floor box assembly of FIG. 1.
Figure 10:
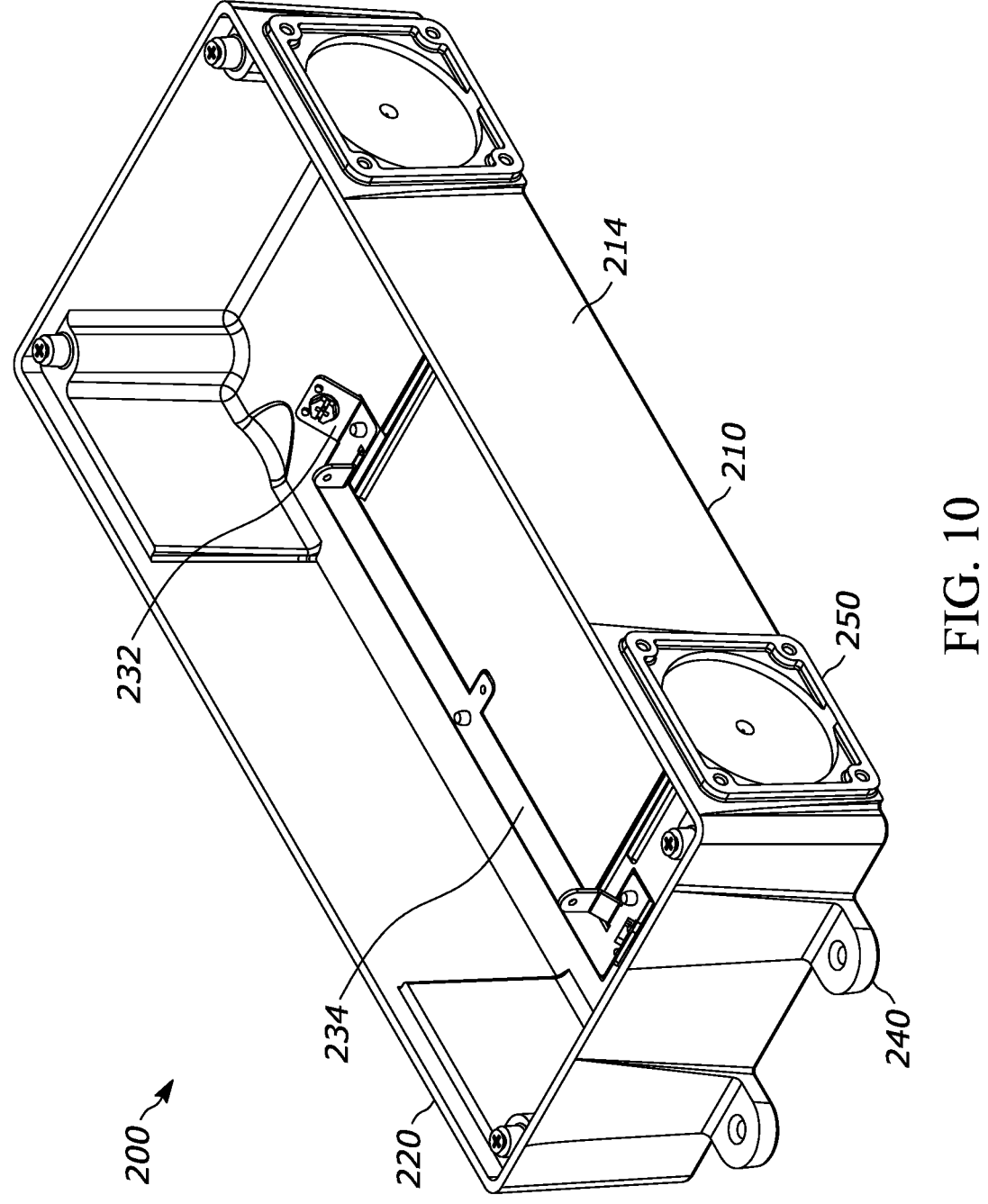
FIG. 10 shows a top perspective view of the electrical floor box assembly of FIG. 9 with the top and wireway cover removed.
Figure 11:
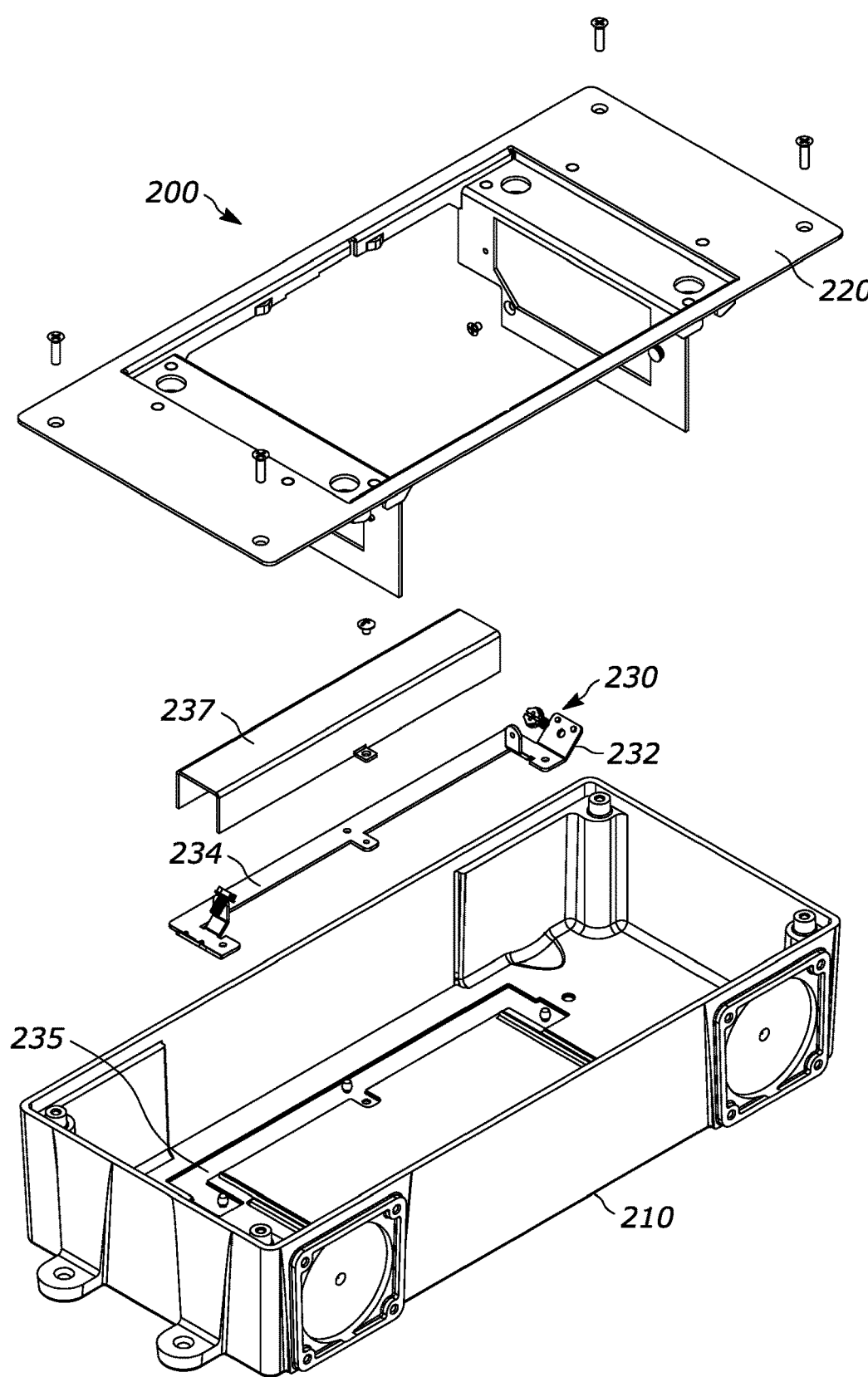
FIG. 11 shows an exploded perspective view of the electrical floor box assembly of FIG. 9.

FIGS. 9-11 show an illustrative embodiment of an electrical floor box assembly 200 having a two-gang configuration with a compartment positioned at either end to receive an electrical device. The floor box assembly 200 includes a base 210, having a bottom wall 212 and one or more lateral walls 214. A top 220 is connected to the base 210. The top 220 includes an opening 226 for providing access to a user to the interior space of the base 210. One or more flanges 240 can extend from one or more of the lateral walls 214. One or more conduits 250 are positioned on one or more of the lateral walls 214. A wireway 237 can extend through the interior between the two compartments.

As best shown in FIG. 10, the floor box assembly 200 has a grounding bus 230 which includes a pair of conductive brackets 232 configured to be in communication with respective compartments at either end of the floor box. A conductive bridge 234 extends between the conductive brackets 232. In an exemplary configuration, the conductive bridge 234 and the conductive brackets 232 are unitarily formed as an integral piece.

As best shown in FIG. 11, the base 210 can include a recess 235 for receiving the grounding bus 230. The recess 235 can include one or more openings to receive fasteners, for example rivets, to secure the grounding bus 230 to the recess. The conductive bracket 232 can have a similar attachment structure to the top 210 as the embodiment shown in FIGS. 1-6 and described previously.

In illustrative applications, the electrical floor box can be used on grade or above grade, and can be installed in any of various floor types, such as, but not limited to, concrete floors, carpet floors, tile floors, vinyl composition tile (VCT) floors, wood floors, terrazzo floors, and raised access floors.

One of ordinary skill will appreciate that the exact dimensions and materials are not critical to the disclosure and all suitable variations should be deemed to be within the scope of the disclosure if deemed suitable for carrying out the objects of the disclosure. In this regard, the electrical floor box can be of any size, such as 1-gang, 2-gang, 3-gang, 4-gang, 5-gang, 6-gang, 7-gang, 8-gang, 9-gang, 10-gang, 11-gang or more as desired.

One of ordinary skill in the art will also readily appreciate that it is well within the ability of the ordinarily skilled artisan to modify one or more of the constituent parts for carrying out the various embodiments of the disclosure. Once armed with the present specification, routine experimentation is all that is needed to determine adjustments and modifications that will carry out the present disclosure.

The above embodiments are for illustrative purposes and are not intended to limit the scope of the disclosure or the adaptation of the features described herein to particular electrical floor box assemblies. Those skilled in the art will also appreciate that various adaptations and modifications of the above-described preferred embodiments can be configured without departing from the scope and spirit of the disclosure. Therefore, it is to be understood that, within the scope of the appended claims, the invention may be practiced other than as specifically described.

What is claimed is:

1. An electrical floor box assembly comprising:
   a base including a bottom wall and a plurality of lateral walls extending from the bottom wall to at least partially define an interior space having at least one compartment;
   a top configured to be removably secured to the base to at least partially close the interior space, the top including an opening for providing access to a user to the interior space of the base when the top is secured to the base; and
   a grounding bus including at least one conductive bracket and a conductive bridge, the at least one conductive bracket configured for attachment to at least one electrical wire forming a grounding path with an electrical device positioned in the at least one compartment, the conductive bridge including a flange having an opening for receiving a fastener to secure the conductive bridge to the base.

2. The electrical floor box assembly of claim 1, wherein the base is made from a non-metallic material, the top includes a metallic material, and the grounding bus is configured to form a grounding path with the top.

3. The electrical floor box assembly of claim 1, wherein the top includes at least one conductive top element oriented toward the bottom wall of the base and configured to penetrate within the base when the top is secured to the base, and wherein the at least one conductive top element is configured to electrically connect to the grounding bus.

4. The electrical floor box assembly of claim 3, wherein the at least one conductive top element and the at least one conductive bracket include respective top attachment openings which are aligned when the top is secured to the base and which are configured to receive a screw for securing the top to the conductive bracket.

5. The electrical floor box assembly of claim 1, wherein the conductive bridge includes a tab configured to receive a divider.

6. The electrical floor box assembly of claim 1, wherein the at least one conductive bracket includes a conductive plate with a wire attachment opening configured for connecting a wire.

7. The electrical floor box assembly of claim 6, wherein the conductive plate includes a horizontal first portion attached to a top surface of the bottom wall of the base, a second portion angled relative to the horizontal first portion and including the wire attachment opening, and a third portion angled relative to the horizontal first portion and including a top attachment opening for connection to the top.

8. The electrical floor box assembly of claim 1, wherein the base includes a recess configured to receive the conductive bracket.

9. The electrical floor box assembly of claim 1, further comprising at least one conduit hub disposed on at least one of the plurality of lateral walls or the bottom wall.

10. The electrical floor box assembly of claim 1, further comprising at least one center drill point configured for locating an opening for mounting a terminal adapter for a conduit attachment.

11. An electrical floor box assembly comprising:
   a base including a bottom wall and a plurality of lateral walls extending from the bottom wall to at least partially define an interior space having at least one compartment, the base being made from a non-metallic material;
   a top configured to be removably secured to the base to at least partially close the interior space, the top including an opening for providing access to a user to the interior space of the base when the top is secured to the base, the top being made from a metallic material;
   a grounding bus positioned in the interior, wherein at least a portion of the ground bus extends vertically relative to the base to contact the top to provide a grounding path with an electrical device positioned in the at least one compartment and the top.

12. The electrical floor box of claim 11, wherein the grounding bus includes a conductive bracket and a conductive bridge.

13. The electrical floor box of claim 12, wherein the conductive bridge and the conductive bracket are separable.

14. The electrical floor box of claim 11, wherein the conductive bus includes a first wire attachment opening in communication with a first compartment and a second wire attachment opening in communication with a second compartment.

15. The electrical floor box of claim 11, wherein the top includes a faceplate extending between an upper surface of the top and the base, the faceplate including an opening for receiving a fastener for connecting the faceplate to the grounding bus.

16. The electrical floor box of claim 11, wherein the base includes a recess for receiving at least a portion of the grounding bus.

17. The electrical floor box of claim 15, further comprising at least one conduit hub disposed on at least one of the plurality of lateral walls or the bottom wall and at least one center drill point configured for locating an opening for mounting a terminal adapter for a conduit attachment.

18. An electrical floor box assembly comprising:

a base including a bottom wall and a plurality of lateral walls extending from the bottom wall to at least partially define an interior space having at least one compartment;

a top configured to be removably secured to the base to at least partially close the interior space, the top including an opening for providing access to a user to the interior space of the base when the top is secured to the base;

a conductive bracket configured for attachment to at least one electrical wire forming a grounding path with an electrical device; and a conductive bridge extending between the conductive bracket and the top and in contact with the top to form a grounding path between the conductive bracket and the top.

19. The electrical floor box assembly of claim 18, wherein the conductive bridge is in contact with the conductive bracket.

20. The electrical floor box assembly of claim 18, wherein at least a portion of the conductive bridge has an L-shaped configuration.

\* \* \* \* \*